US009853826B2

(12) United States Patent
Shuman et al.

(10) Patent No.: US 9,853,826 B2
(45) Date of Patent: Dec. 26, 2017

(54) ESTABLISHING GROUPS OF INTERNET OF THINGS (IOT) DEVICES AND ENABLING COMMUNICATION AMONG THE GROUPS OF IOT DEVICES

(71) Applicant: QUALCOMM Incorporated, San Diego, CA (US)

(72) Inventors: Mohammed Ataur Rahman Shuman, San Diego, CA (US); Amit Goel, San Diego, CA (US); Sandeep Sharma, San Diego, CA (US); Binita Gupta, San Diego, CA (US); Ashutosh Aggarwal, San Diego, CA (US); Isaac David Guedalia, Bet Shemesh (IL); Ravinder Paul Chandhok, Del Mar, CA (US); Jacob Guedalia, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 14/187,123

(22) Filed: Feb. 21, 2014

(65) Prior Publication Data
US 2014/0241354 A1 Aug. 28, 2014

Related U.S. Application Data

(60) Provisional application No. 61/769,150, filed on Feb. 25, 2013, provisional application No. 61/769,153, filed on Feb. 25, 2013.

(51) Int. Cl.
*H04L 12/28* (2006.01)
*H04L 29/06* (2006.01)
(Continued)

(52) U.S. Cl.
CPC ........ *H04L 12/2803* (2013.01); *H04L 12/281* (2013.01); *H04L 12/2809* (2013.01);
(Continued)

(58) Field of Classification Search
None
See application file for complete search history.

(56) References Cited

U.S. PATENT DOCUMENTS 6,856,236 B2   2/2005   Christensen et al.
8,374,104 B2 *  2/2013   Gauweiler ........ H04L 29/12254
                                                   370/255
(Continued)

FOREIGN PATENT DOCUMENTS

CN   102170641 A   8/2011
CN   102932751 A   2/2013
(Continued)

OTHER PUBLICATIONS

Atzori L., et al., "The Social Internet of Things (SIoT)—When Social Networks meet the Internet of Things: Concept, Architecture and Network Characterization," Nov. 2012, vol. 56 (16), pp. 3594-3608.
(Continued)

*Primary Examiner* — Hicham Foud
(74) *Attorney, Agent, or Firm* — Muncy, Geissler, Olds & Lowe, P.C.

(57) ABSTRACT

The disclosure generally relates to enabling communication among one or more Internet of Things (IoT) device groups. In particular, various heterogeneous IoT devices that may need to interact with one another in different ways may be organized into IoT device groups to support efficient interaction among the IoT devices. For example, pre-defined IoT device groups may be formed organize certain IoT devices that perform similar activities and certain IoT devices may be dynamically allocated to ad-hoc IoT device groups for certain contexts (e.g., the ad-hoc IoT device groups may include IoT devices that can implement a desired function and therefore be dynamically formed to implement the desired function). Furthermore, the IoT groups may com-
(Continued)

municate hierarchically, wherein messages may be exchanged among IoT group owners or ranking members to support efficient communication between different IoT groups.

42 Claims, 14 Drawing Sheets

(51) Int. Cl.
  *H04L 29/08*     (2006.01)
  *H04W 4/00*     (2009.01)
  *H04W 4/02*     (2009.01)
  *H04W 4/08*     (2009.01)
  *H04W 84/18*    (2009.01)
  *H04L 12/24*    (2006.01)

(52) U.S. Cl.
  CPC ............ *H04L 41/12* (2013.01); *H04L 65/102* (2013.01); *H04L 67/12* (2013.01); *H04L 67/16* (2013.01); *H04W 4/005* (2013.01); *H04W 4/023* (2013.01); *H04W 4/08* (2013.01); *H04W 84/18* (2013.01); *H04W 4/008* (2013.01)

(56) References Cited

U.S. PATENT DOCUMENTS

| | | | |
|---|---|---|---|
| 8,989,194 B1* | 3/2015 | Poutievski | H04L 41/12 370/360 |
| 2003/0147386 A1* | 8/2003 | Zhang | H04L 12/185 370/390 |
| 2003/0224807 A1 | 12/2003 | Sinha et al. | |
| 2003/0227479 A1* | 12/2003 | Mizrahi | A63F 13/10 715/753 |
| 2005/0060406 A1* | 3/2005 | Zhang | H04L 41/12 709/225 |
| 2005/0132408 A1 | 6/2005 | Dahley et al. | |
| 2006/0155981 A1 | 7/2006 | Mizutani et al. | |
| 2007/0253421 A1* | 11/2007 | Cai | H04J 3/247 370/394 |
| 2007/0299947 A1* | 12/2007 | El-Damhougy | H04W 76/028 709/223 |
| 2008/0218148 A1 | 9/2008 | Robertson et al. | |
| 2009/0083374 A1 | 3/2009 | Saint | |
| 2009/0164450 A1* | 6/2009 | Martinez | G06F 17/30864 |
| 2009/0201851 A1* | 8/2009 | Kruys | H04W 16/14 370/328 |
| 2011/0314168 A1* | 12/2011 | Bathiche | H04W 4/206 709/228 |
| 2012/0040700 A1 | 2/2012 | Gomes et al. | |
| 2012/0078978 A1* | 3/2012 | Shoolman | G06F 17/30607 707/803 |
| 2012/0108230 A1* | 5/2012 | Stepanian | G06F 21/10 455/422.1 |
| 2012/0143355 A1* | 6/2012 | Honma | H04L 12/2807 700/17 |
| 2013/0148607 A1* | 6/2013 | Yu | H04W 8/186 370/329 |
| 2013/0170499 A1* | 7/2013 | Ramanujan | H04W 40/26 370/401 |
| 2013/0173621 A1 | 7/2013 | Kapoor et al. | |
| 2013/0226971 A1* | 8/2013 | Shoolman | G06F 17/30575 707/790 |
| 2013/0232177 A1* | 9/2013 | Shoolman | G06F 17/30289 707/803 |
| 2013/0290967 A1* | 10/2013 | Calciu | G06F 9/526 718/102 |
| 2014/0003339 A1* | 1/2014 | Jain | H04W 28/08 370/328 |
| 2014/0153499 A1* | 6/2014 | Wang | H04W 24/02 370/329 |

FOREIGN PATENT DOCUMENTS

| | | |
|---|---|---|
| CN | 103024008 A | 4/2013 |
| CN | 103116321 A | 5/2013 |
| EP | 2557892 A1 | 2/2013 |
| WO | 2010095923 A2 | 8/2010 |

OTHER PUBLICATIONS

International Search Report—PCT/US2014/018412—ISA/EPO—dated May 15, 2014.
Taiwan Search Report—TW103106313—TIPO—dated Jun. 16, 2016.
Vermesan O., et al., "Internet of Things Strategic Research Roadmap; CERP-loT SRA_loT", ETSI Draft; CERP-IOT-SRA_IOt, European Telecommunications Standards Institute (ETSI), 650, Route Des Lucioles ; F-06921 Sophia-Antipolis; France, vol. zArchive, Dec. 10, 2009 (Dec. 10, 2009), pp. 1-50, XP014121203, [retrieved on Dec. 10, 2009] chapter 3.
Kardeby V., "Automatic Sensor Clustering," Connectivity for the Internet of Things, Department of Information Technology and Media, Mid Sweden University, 2011, 66 pages.
Ding L., et al., "The Clustering of Internet, Internet of Things and Social Network," 3rd International Symposium on Knowledge Acquisition and Modeling, IEEE, 2010, pp. 417-420.

* cited by examiner

ESTABLISHING GROUPS OF INTERNET OF THINGS (IOT) DEVICES AND ENABLING COMMUNICATION AMONG THE GROUPS OF IOT DEVICES

CROSS-REFERENCE TO RELATED APPLICATIONS

The present Application for Patent claims the benefit of Provisional Patent Application No. 61/769,150 entitled "IOT GROUP COMMUNICATION," filed Feb. 25, 2013, and further to Provisional Patent Application No. 61/769,153 entitled "ESTABLISHING GROUPS OF INTERNET OF THINGS (IOT) DEVICES BASED ON ATTRIBUTE RELEVANCE FOR ACHIEVING A DESIRED FUNCTION," filed Feb. 25, 2013, each assigned to the assignee hereof and hereby expressly incorporated herein by reference in its entirety.

TECHNICAL FIELD

Various embodiments described herein are generally directed to communication among one or more Internet of Things (IoT) device groups, and in particular, to organizing various heterogeneous IoT devices into pre-defined and/or ad-hoc IoT device groups to support efficient interaction among IoT devices and achieve desired functions.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines. However, difficulty may arise in relation to coordinating communication among devices that may share various static and/or dynamic attributes and need to work in conjunction with other device that may have different static and/or dynamic attributes in common. For example, difficulty may arise in relation to providing interfaces that may coordinate communication among proximate, ad-hoc devices with various device types (e.g., lights, printers, refrigerators, air conditioners, etc.) to work together in order to implement a desired function that involves their respective attributes (e.g., providing light, cooling an enclosed environment, etc.).

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one exemplary aspect, the disclosure generally relates to enabling communication among one or more Internet of Things (IoT) device groups. In particular, various heterogeneous IoT devices that may need to interact with one another in different ways may be organized into IoT device groups to support efficient interaction among the IoT devices. For example, pre-defined IoT device groups may be formed organize certain IoT devices that perform similar activities and certain IoT devices may be dynamically allocated to ad-hoc IoT device groups for certain contexts (e.g., certain durations or time periods, certain locations, based on owner presence, based on the status of the IoT devices such as all the IoT devices using a particular resource or having a particular operational state, etc.). Furthermore, the IoT groups may be organized in a hierarchical manner, wherein messages may be exchanged among IoT group owners or ranking members to support efficient communication between different IoT groups. For example, group owners, managers, or ranking members associated with different IoT groups may communicate with one another to support communication among multiple groups, whereby an IoT device in a particular group seeking to communicate with any IoT devices in another IoT group may address the group owner, manager, or ranking members associated with the other IoT group without having to locate or otherwise communicate with each individual member. Furthermore, the communication between different IoT groups may be coordinated via the group owners, managers, or ranking members associated therewith, which may reduce communication overhead, increase efficiency, and improve overall user experience.

According to another exemplary aspect, various mechanisms disclosed herein may form multiple IoT devices into multiple IoT groups according to one or more group criteria and attributes associated with the one or more IoT devices and define one or more hierarchies within each IoT group according to the one or more group criteria and the attributes associated with the one or more IoT devices, wherein the one or more hierarchies control intra-group communication within each IoT group and inter-group communication among the multiple IoT groups (e.g., the group criteria may include static criteria such that the hierarchies may be defined based on the static criteria and permanent attributes associated with the IoT devices in each IoT group, dynamic criteria such that the hierarchies may be defined based on the dynamic criteria and contextually limited attributes associated with the IoT devices in each IoT group, etc.). In one embodiment, the one or more hierarchies may designate a group owner within each IoT group that may then coordinate the inter-group communication with other IoT groups, wherein a server may communicate with the designated group owners in each IoT group to further coordinate the inter-group communication and/or the designated group owners in each IoT group may communicate peer-to-peer to coordinate the inter-group communication. For example, in one embodiment, an IoT device in a first IoT group may send a message to an address associated with a target IoT group and the designated group owner associated with the target IoT group may receive and forward the message to other IoT devices in the target IoT group according to the one or more hierarchies that control the inter-group communication. Furthermore, in one embodiment, the one or more hierarchies may further designate certain ranking members within each IoT group, wherein the designated ranking members may coordinate the intra-group communication within each IoT group.

According to another exemplary aspect, a plurality of local communication devices, such as a set of proximate Internet of Things (IoT) devices, may be detected and a set of attributes associated with each of the local communication devices may be determined. Accordingly, based on a desired function to be implemented, a subset of the plurality of local communication devices that can implement the desired function may be determined based on their respective sets of attributes and the subset of local communication devices may be directed to form an independent IoT device group that can communicate over a local communication channel and the independent IoT device group may then be directed to implement the desired function. For example, in one exemplary use case, the plurality of proximate IoT devices may include one or more light sources, the desired function to implement may comprise reducing light interference near a projection screen in proximity to the plurality of IoT devices, and the one or more attributes may include light emission capabilities, installation positions, and light output orientations associated with the one or more light sources. As such, the subset of the plurality of IoT devices formed into the independent device group may be those IoT devices that are expected to cause the light interference near the projection screen based on one or more of the light emission capabilities, the installation positions, or the orientations associated with the one or more light sources, whereby the subset of the plurality of IoT devices formed into the independent device group may be configured to reduce the light interference near the projection screen by reducing light output levels and/or changing the light output orientations associated therewith. In another exemplary use case, the plurality of proximate IoT devices may include one or more air conditioners, the desired function to implement may comprise cooling a room, and the one or more attributes may include identified areas that the one or more air conditioners can cool and degrees to which the one or more air conditioners can cool the identified areas. As such, the subset of the plurality of IoT devices formed into the independent device group may include those IoT devices that are configured to cool the room, whereby the subset of the plurality of IoT devices formed into the independent device group may be configured to adjust cooling output levels to cool the room.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device, according to various aspects of the disclosure, while

DETAILED DESCRIPTION

Figure 1A:
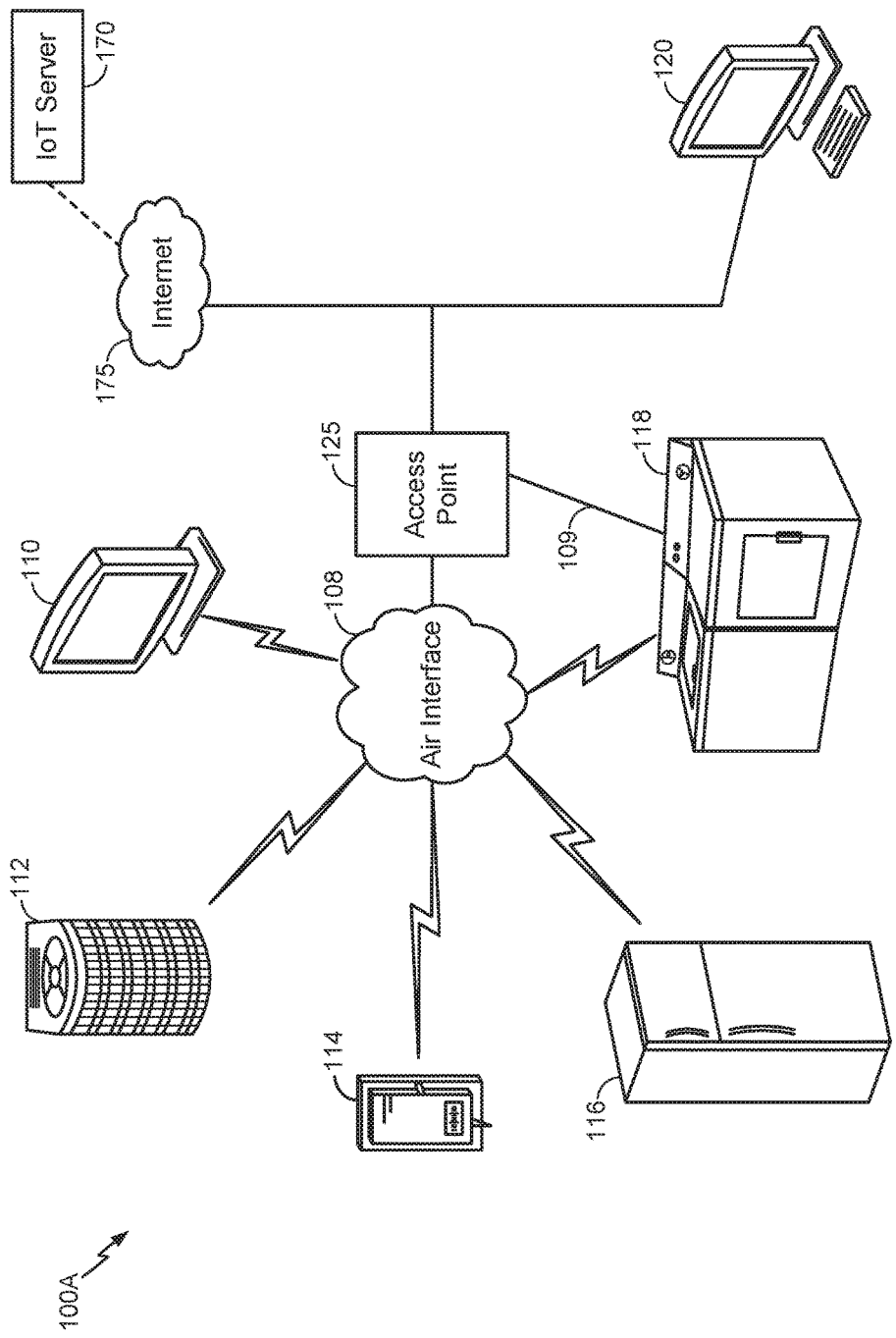
FIGS. 1A-1E illustrates exemplary high-level system architectures of a wireless communications system, according to various aspects of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
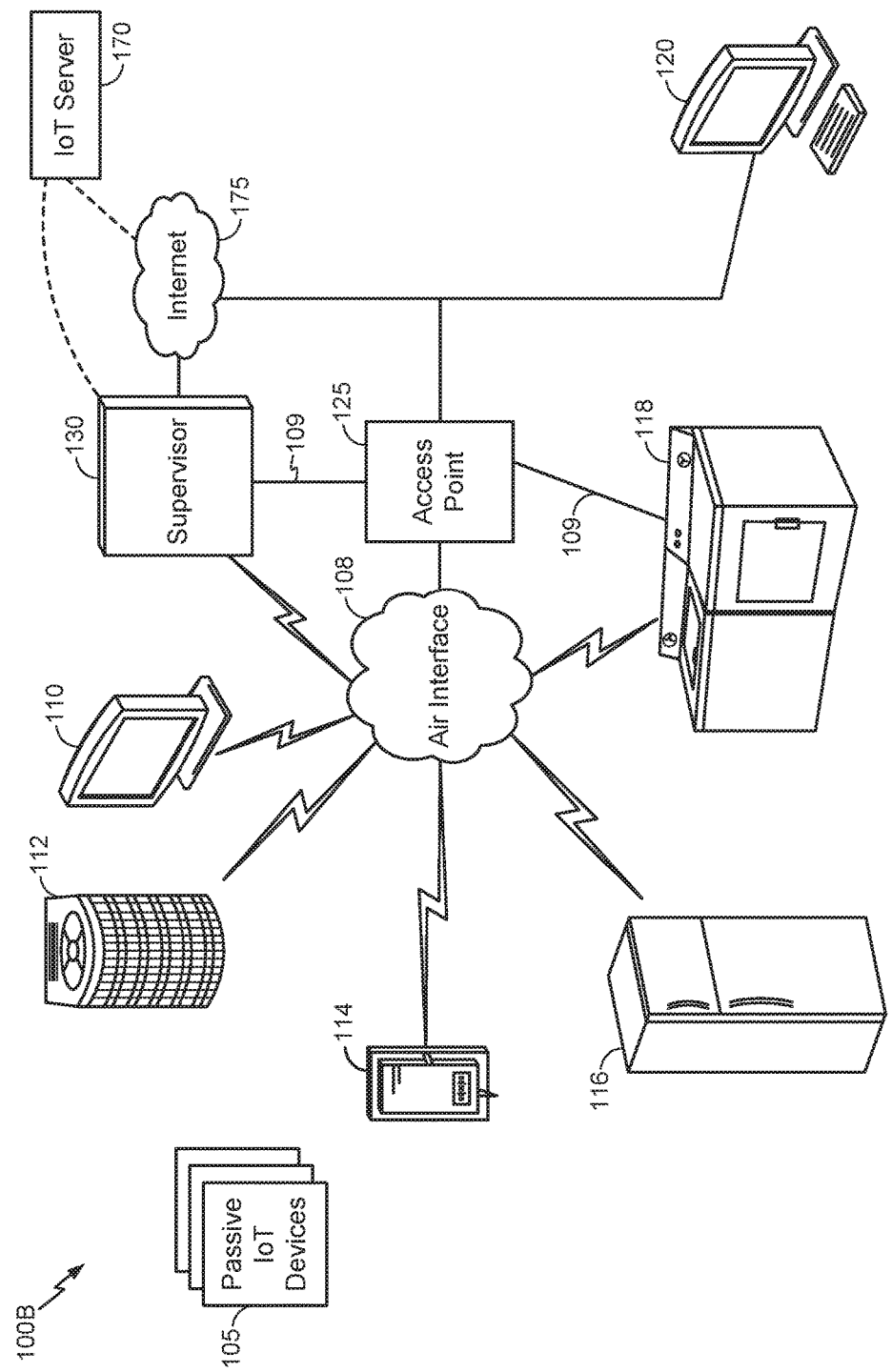

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
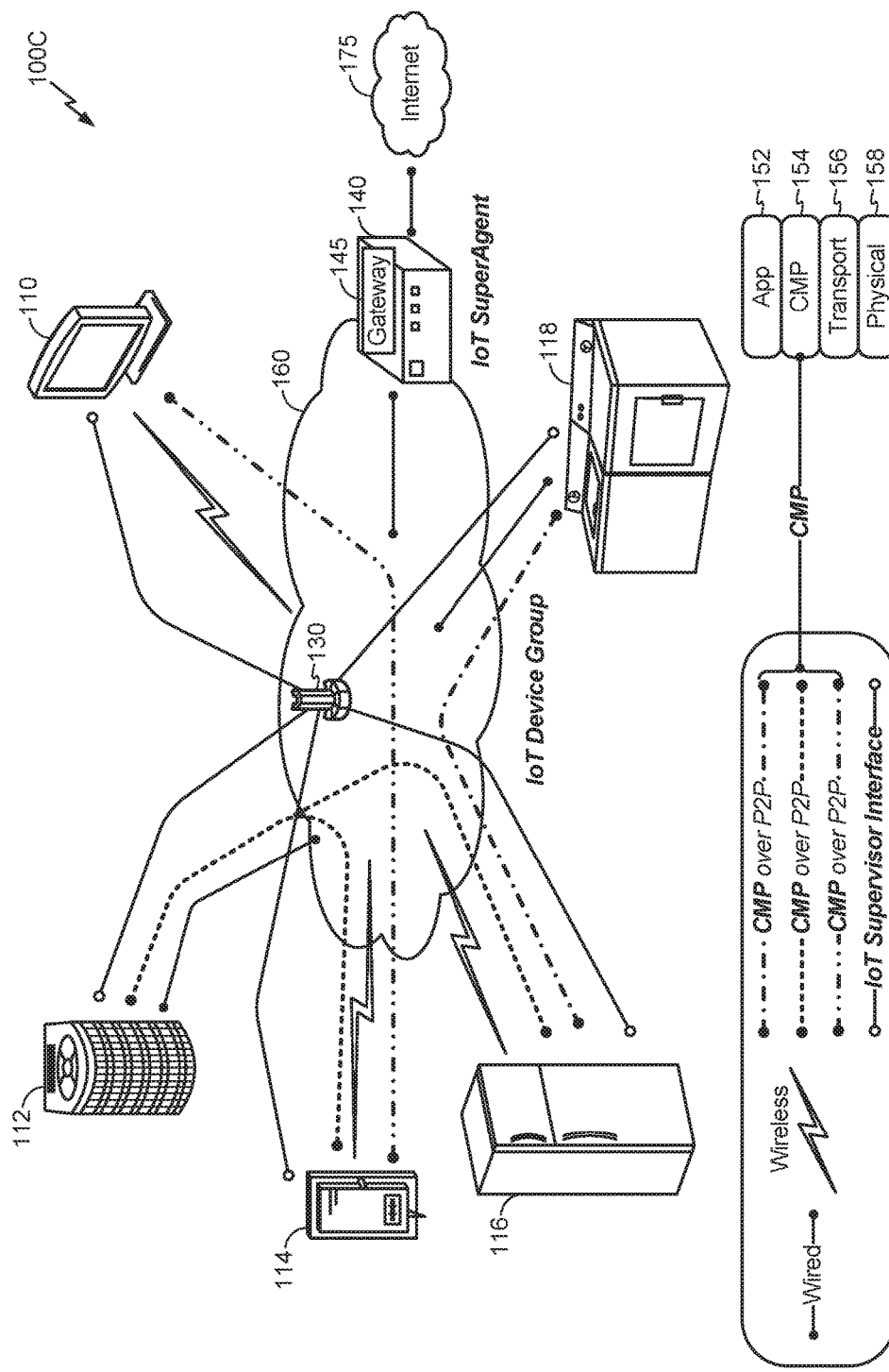

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
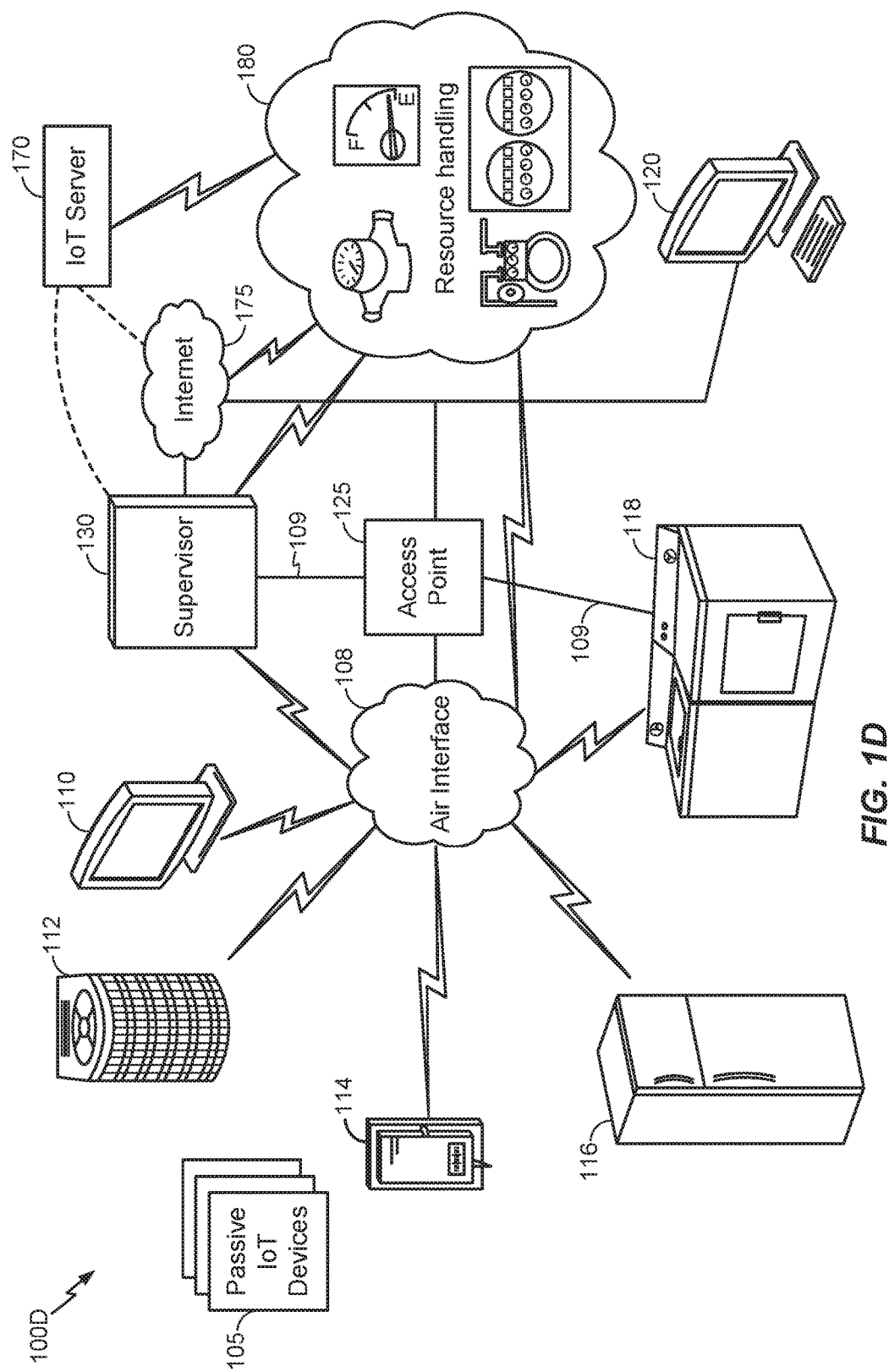

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
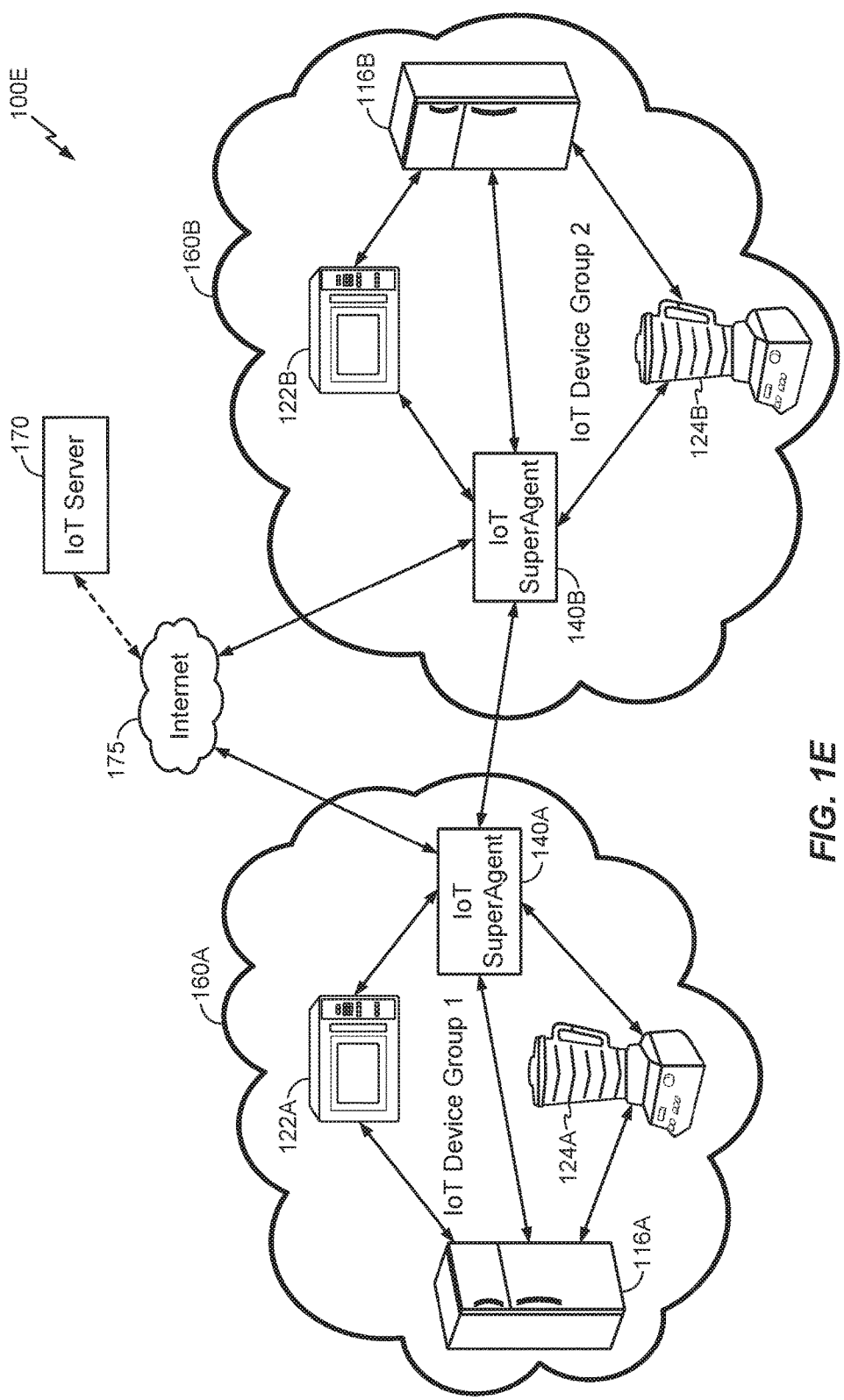

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
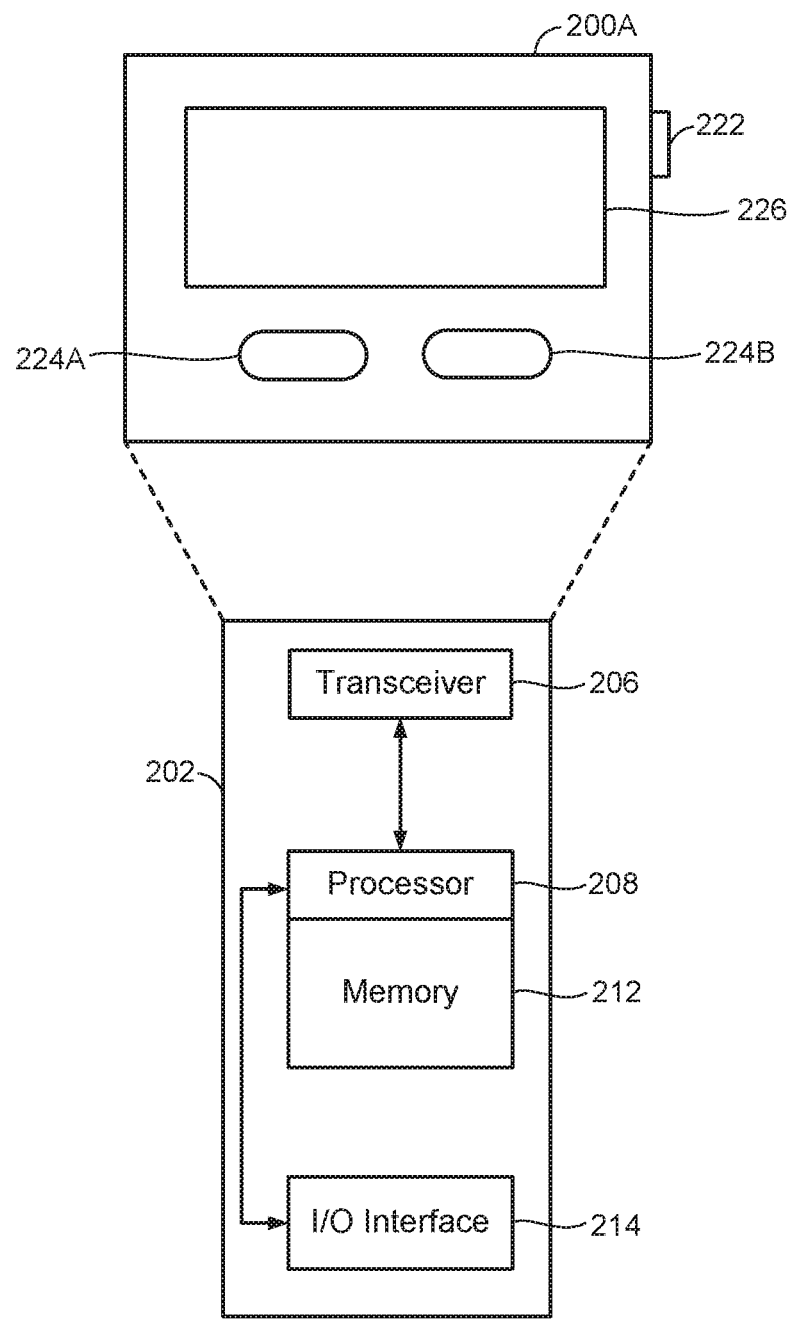

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
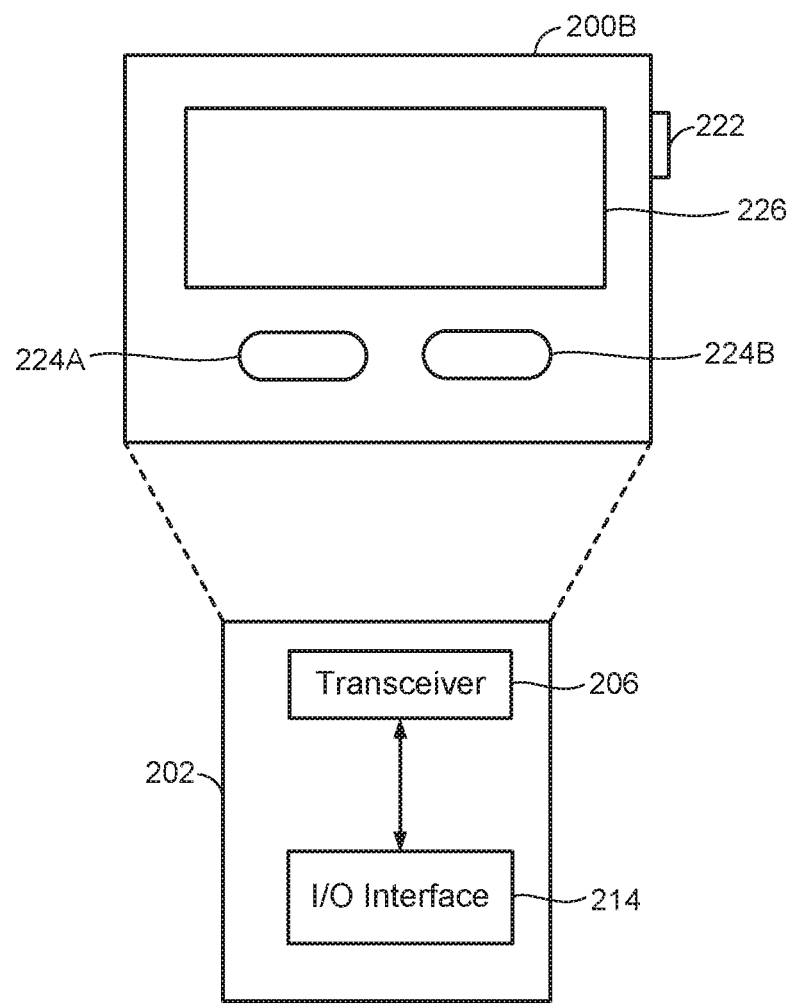
FIG. 2B illustrates an exemplary passive IoT device, according to various aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
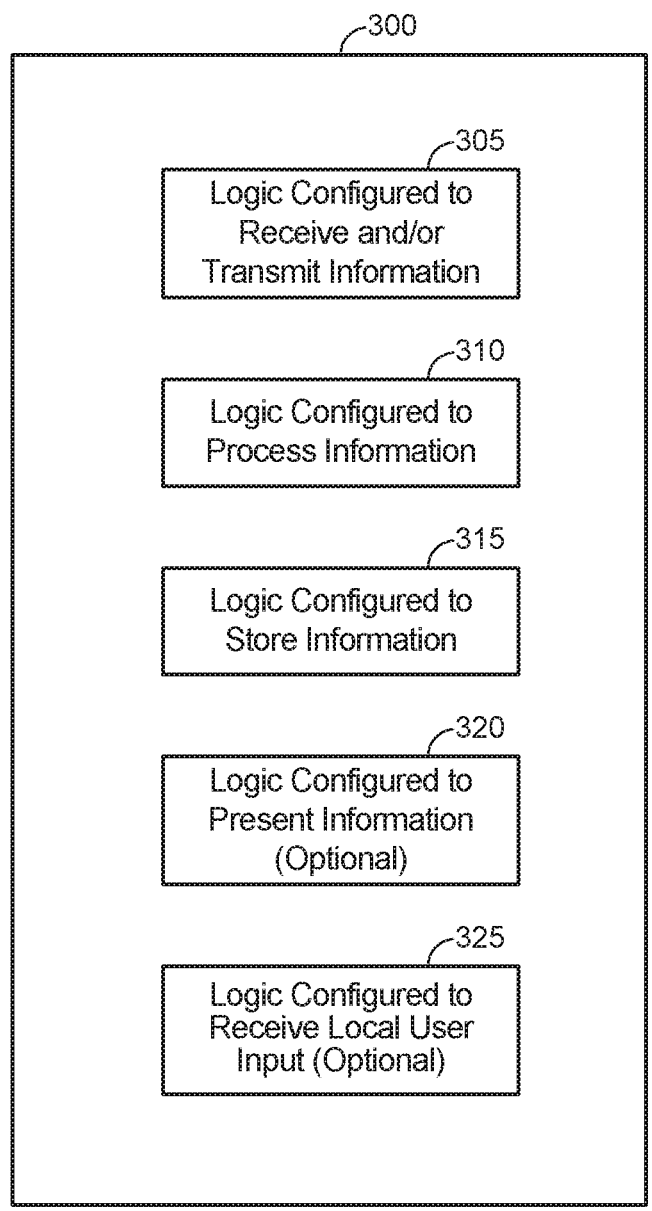
FIG. 3 illustrates an exemplary communication device that includes logic configured to perform functionality, according to various aspects of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
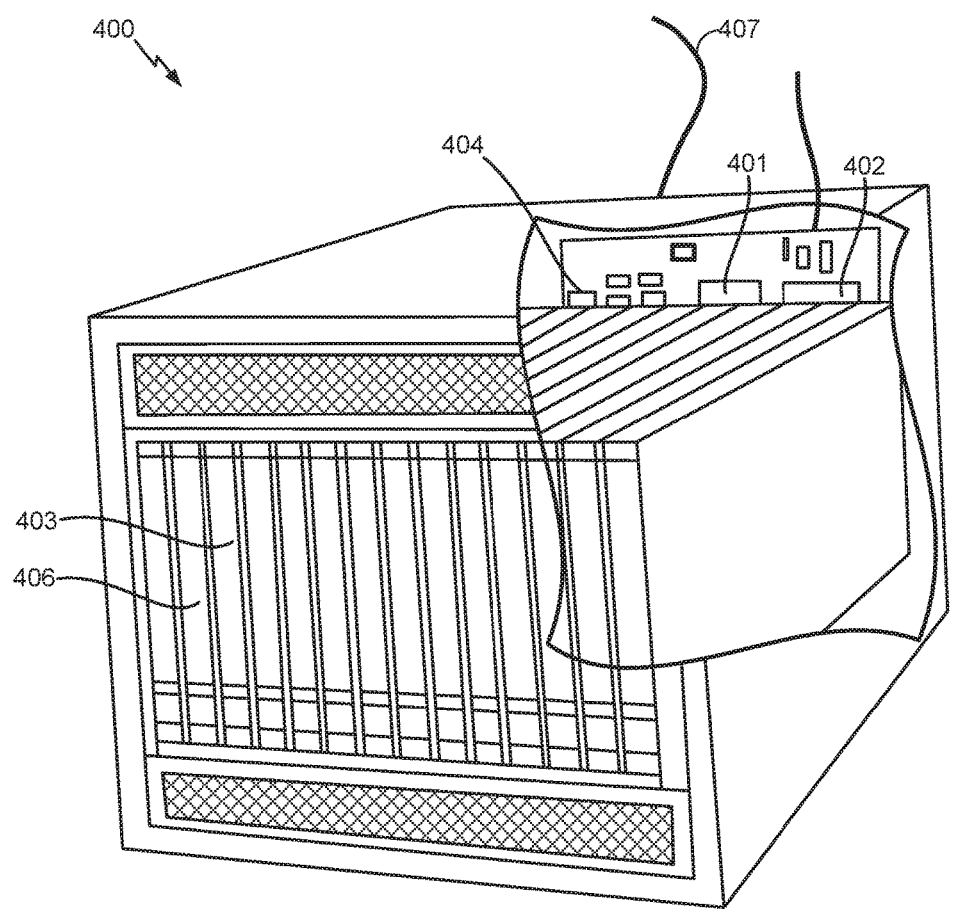
FIG. 4 illustrates an exemplary server, according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP based technologies and services have become more mature, driving down the cost and increasing availability of IP. This has allowed Internet connectivity to be added to more and more types of everyday electronic objects. The IoT is based on the idea that everyday electronic objects, not just computers and computer networks, can be readable, recognizable, locatable, addressable, and controllable via the Internet. In general, with the development and increasing prevalence of the IoT, numerous heterogeneous IoT devices that perform different activities and need to interact with one another in many different ways may be in use in homes, workplaces, cars, shopping centers, and various other locations. As such, due to the potentially large number of heterogeneous IoT devices that may be in use, direct communication among individual IoT devices may be inefficient or insufficient to meet user demands and needs. Accordingly, as will be described in further detail below with reference to FIG. 5, various IoT devices may be organized or otherwise formed into groups to enable different IoT devices to work together more efficiently, optimize communication among different IoT devices, and improve effectiveness and overall user experience.

Figure 5:
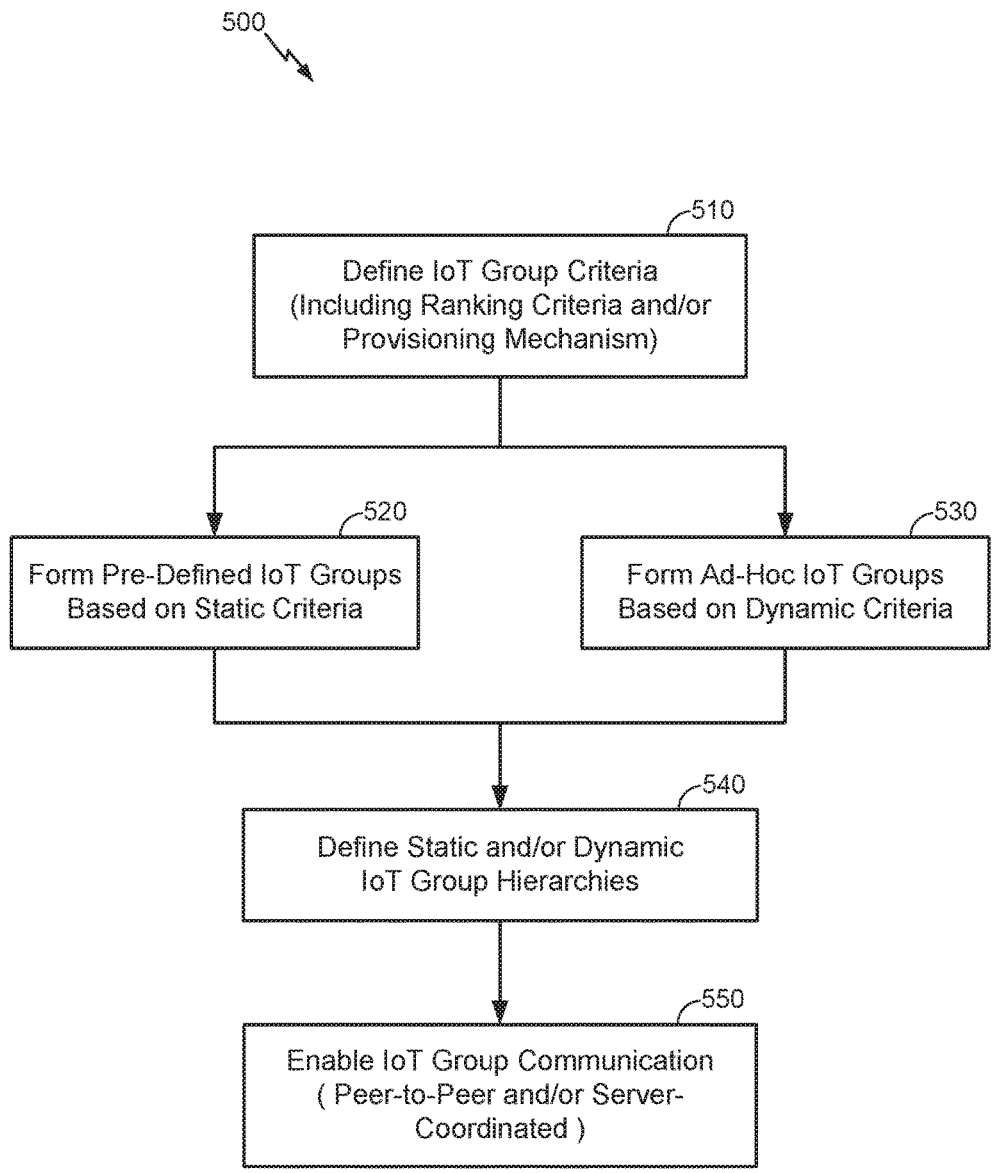
FIG. 5 illustrates an exemplary method for grouping IoT devices based on static and dynamic attributes associated with the IoT devices, according to various aspects of the disclosure.

More particularly, according to one aspect of the disclosure, FIG. 5 illustrates an exemplary method 500 for forming IoT device groups and enabling communication among IoT device groups. In general, the method 500 shown in FIG. 5 may be carried out using the IoT server 170, the access point 125, the supervisor device 130 (or IoT manager 130 or IoT manager device 130), the IoT SuperAgent 140, or another suitable device, application, or process in the wireless communications systems 100A-100E shown in FIGS. 1A-1E and described in further detail above. As such, where the following description relating to FIGS. 5-9 uses the terminology "device organizer," those skilled in the art will appreciate that the device organizer terminology is used solely for simplicity and ease of description, and that the device organizer may comprise the IoT server 170, the access point 125, the supervisor device 130 (or IoT manager 130 or IoT manager device 130), the IoT SuperAgent 140 in the wireless communications systems 100A-100E shown in FIGS. 1A-1E or other appropriate devices, applications, or processes that can suitably implement the functions described herein.

In one embodiment, the method 500 shown in FIG. 5 may include defining various criteria to form the IoT device groups at block 510, wherein the IoT group criteria defined at block 510 may include appropriate criteria to rank members within a particular IoT group, provisioning mechanisms to allocate IoT devices to certain groups, or other suitable group criteria. For example, in one embodiment, the criteria defined at block 510 may define certain activities or contexts that may be the same, substantially similar, or otherwise related among various different IoT devices (e.g., dishwashers, showers, bathtubs, hot water heaters, washing machines, etc. may all utilize hot water, while televisions, Blu-ray players, DVRs, etc. may all be considered media devices, etc.). Furthermore, in one embodiment, the criteria defined at block 510 may define certain dynamic contexts that may be limited in scope, duration, location, or otherwise (e.g., dishwashers, showers, bathtubs, hot water heaters, washing machines, etc. may all utilize hot water but only actually use hot water at certain times).

In one embodiment, in response to suitably defining the IoT device grouping criteria at block 510, the device organizer may form one or more pre-defined IoT device groups based on static criteria at block 520. For example, in one embodiment, one or more IoT devices that perform the same or substantially similar activities, utilize the same or substantially similar resources, or otherwise have certain permanently common characteristics may be persistently allocated to the pre-defined IoT device groups at block 520 to enable communication among all IoT devices that have the permanently common characteristics. Further, in one embodiment, the device organizer may allocate certain IoT devices to one or more ad-hoc IoT device groups at block 530 to the extent that such IoT devices may perform the same or substantially similar activities in certain limited contexts, utilize the same or substantially similar resources in certain limited contexts, or otherwise have certain temporarily common characteristics. For example, in one embodiment, the ad-hoc IoT device groups may be formed at block 530 to implement a particular desired function, whereby one or more IoT devices that have attributes indicating support for the desired function may be dynamically allocated to the ad-hoc IoT device group and then directed to implement the desired function (e.g., as will be described in further detail below with respect to FIGS. 6-9). Accordingly, in one embodiment, the device organizer may determine whether one or more dynamic IoT device group formation criteria have been satisfied and dynamically allocate one or more IoT devices to one or more ad-hoc IoT device groups at block 530 in response to determining that the dynamic IoT device group formation criteria have been satisfied. For example, the ad-hoc IoT device groups formed at block 530 may be defined to last a certain time, encompass IoT devices in certain locations, or encompass IoT devices that otherwise share a context based on current status (e.g., during owner presence, IoT devices using certain resources such as all the IoT devices using hot water may be automatically made part of a hot water group, IoT devices having a particular operating state such as all IoT devices that are currently active may be made part of a busy group, etc.). Accordingly, the members within the various pre-defined IoT device groups and/or ad-hoc IoT device groups may generally be allocated based on suitable static and/or dynamic criteria, respectively. Among other advantages, grouping IoT devices into the pre-defined and ad-hoc groups can enable a particular IoT device to send a message to a particular pre-defined or ad-hoc group without having to know the members within the group. For example, in one embodiment, an energy meter IoT device can send a command to an ad-hoc "idle" IoT device group to enter an offline state in response to receiving an appropriate signal from a power grid.

In one embodiment, in response to suitably forming the pre-defined IoT device groups at block 520 and/or any ad-hoc IoT device groups that satisfy the dynamic group formation criteria at block 530, one or more hierarchies associated with the formed IoT device groups may be defined at block 540. For example, in one embodiment, the hierarchies defined at block 540 may designate a particular IoT device in each group as the owner or manager associated therewith. In another example, the hierarchies defined at block 540 may rank the IoT devices in each group (e.g., according to the manner in which the various grouped IoT devices interact with one another, perform common or otherwise similar activities, have dependent relationships, etc.).

In one embodiment, the hierarchies defined at block 540 may then be used to enable communication among the various pre-defined and/or ad-hoc IoT device groups at block 550. For example, in one embodiment, block 550 may enable communication in a manner whereby only the group owners or managers associated with multiple IoT device groups (or certain IoT device groups) communicate with one another. In this manner, the IoT device group owners or managers may relay messages to and from member IoT devices such that the only inter-group communication occurs between the group owners or managers (e.g., an originator IoT device can send a message to an address associated with a target IoT group, wherein based on rankings or other hierarchies within the target IoT group, a ranking manager, owner, server, or other member therein can send the message to other members based on rankings or other hierarchical criteria). In another example, hierarchical group communication may be enabled at block 550, wherein certain messages that are directed to certain IoT devices among all the IoT devices in a particular group may be targeted to one or more ranking members in the group (e.g., a message to record a particular television program may be directed to a master DVR in a multi-room DVR system where certain set-top boxes in satellite rooms stream content recorded on the master DVR). In another example, all IoT devices in a home that are currently using hot water may be dynamically allocated to an ad-hoc hot water IoT device group, whereby any IoT device that wants to communicate with the IoT devices in the ad-hoc hot water group can address the group (e.g., via a message to the group owner or manager) without needing to know or otherwise identify the individual IoT member devices. Further, in one embodiment, the IoT group communication enabled at block 550 may comprise peer-to-peer communication. In particular, the peer-to-peer IoT group communication may enable an originating IoT device to ping a manager IoT device within a target IoT group to find the members associated with the target IoT group. As such, the originating IoT device may then communicate with the various members in the target IoT group peer-to-peer.

In one embodiment, in response to suitably forming the IoT device groups, defining the hierarchies associated with the IoT device groups, and enabling communication among the IoT device groups, the method 500 may return to blocks 520 and 530 to manage the IoT device groups. For example, certain IoT member devices may be dynamically allocated or removed from one or more ad-hoc IoT device groups at block 530 in response to changes in status associated therewith. In another example, a certain IoT device that an owner no longer uses may be removed from any pre-defined IoT device group or ad-hoc IoT device group in which the IoT device was a member at block 520. Furthermore, in one embodiment, a new IoT device may be added to one or more pre-defined IoT device groups upon initialization at block 520 and/or ad-hoc IoT device groups at block 530 based on a current status and/or subsequent changes in status. For example, a new refrigerator IoT device may join a pre-defined IoT group that includes every IoT device in a network upon initialization and join a closed refrigerator IoT group in a neighborhood that can send consolidated orders to a grocery store. In another example, a local neighborhood may include a closed sprinkler controller IoT device group that can share weather information and coordinate operational times (e.g., the group owner or another suitable ranking member in the sprinkler controller IoT device group may subscribe to weather forecasts and inform all other members in the group about upcoming weather forecasts to coordinate when and/or how long the sprinklers should enter an operational state). In still another example, a bathtub IoT device may notify an ad-hoc hot water group that water will be required for a certain time period (e.g., the next 15 minutes or until the bathtub has filled), or the bathtub may appropriately join the ad-hoc hot water group for the time period during which hot water will be required.

According to various aspects of the disclosure, FIG. 6 illustrates a method 600 in which a subset of proximate IoT devices may be directed to form an independent IoT device group that implements a desired or target function, wherein the device organizer mentioned above may perform the method 600 shown in FIG. 6 to direct a subset of proximate (or proximately located) IoT devices to form an independent IoT device group that implements a desired or target function. For example, referring to FIG. 6, the device organizer may detect a plurality of local IoT devices in proximity to each other at block 610 and determines attributes associated with each of the plurality of local IoT devices at block 620. For example, at blocks 610 and 620, the plurality of local IoT devices may turn on and report both location information (e.g., relative locations such as room locations in a building or geographic coordinates obtained via a position location procedure, etc.) and device attribute information to the device organizer in conjunction with a registration procedure. In a further example, the detection that occurs at block 610 may occur via a bootstrapping channel dedicated to IoT device discovery. As such, if the device organizer is proximate to the plurality of proximally located IoT devices, the bootstrapping channel can correspond to a particular wireless frequency or one or more timeslots reserved to discover and register IoT devices. Alternatively, if the device organizer is remote from the proximally located IoT devices (e.g., at an Internet-accessible location similar to the application server 170 in FIGS. 1A-E), the bootstrapping channel may not be used or alternatively comprise a default or reserved IP address assigned to the device organizer and used to register IoT devices.

As will be explained in more detail below, the device attribute information can include general device capability information that may be generic to the associated IoT device type (e.g., capabilities to output sound, present video, emit light, measure temperature, etc.) or IoT device-specific device capability information (e.g., capabilities to heat or cool a particular indoor space, output sound in a particular direction or with particular acoustic effects, emit between 200-300 lumens of light on a particular section of a wall in a conference room, etc.).

Figure 6:
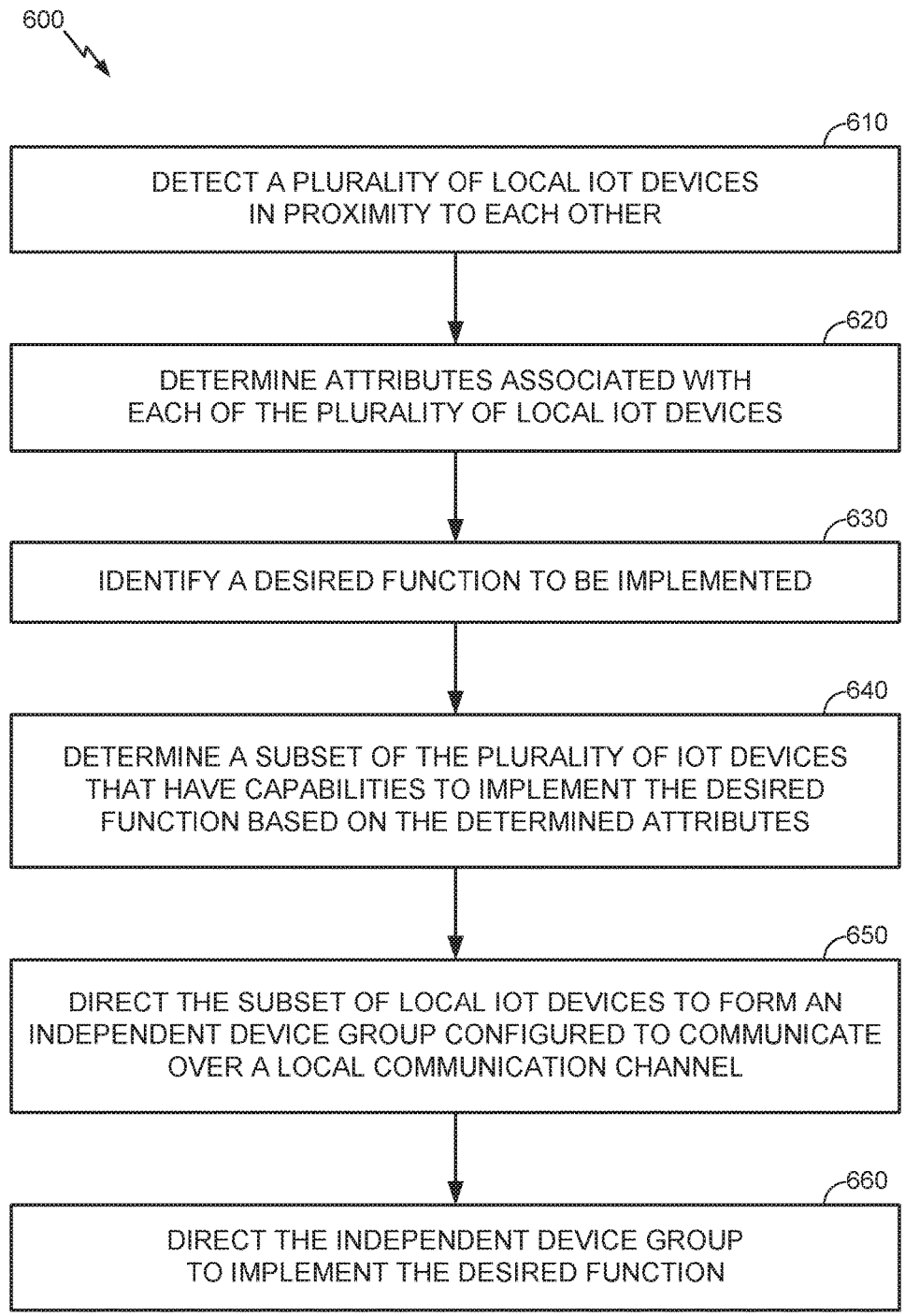
FIG. 6 illustrates an exemplary method in which a subset of proximate IoT devices may be directed to form an independent IoT device group that implements a desired or target function, according to various aspects of the disclosure.

Still referring to FIG. 6, at block 630, the device organizer may identify a desired function to implement in proximity to the plurality of local IoT devices that were detected at block 610. For example, the desired function can be implementing a specialized lighting control scheme during a movie presentation, modifying the temperature in a conference room to accommodate the preferences of certain individuals detected in the room, and so on. Using the attributes associated with the plurality of local IoT devices that were determined at block 620, the device organizer may then determine a subset of the plurality of local IoT devices that can implement the desired function based on their respective attributes at block 640. For example, if the desired function relates to a specialized lighting scheme, the subset determined at block 640 can include IoT devices that are associated with lighting (e.g., light-emitting IoT devices such as light bulbs or light switches, light-detecting IoT devices such as cameras, etc.).

In one embodiment, in response to suitably determining the subset of the plurality of IoT devices that support or otherwise have capabilities to implement the desired function at block 640, the device organizer may then direct the determined subset of local IoT devices to form an independent device group at block 650. In one embodiment, signaling between the device organizer and the subset of local IoT devices that may be used to direct the subset of local IoT devices to form the independent device group at block 650 can occur over the bootstrapping channel or some other channel. Furthermore, in one embodiment, the independent device group formed at block 650 may be configured to communicate over an independent local communication channel (e.g., independent from the bootstrapping channel), which may be selected subsequent to the subset of local IoT devices forming the independent device group based on one or more attributes or other suitable characteristics associated with the subset of local IoT devices forming the independent device group. For example, in one embodiment, the independent communication channel can correspond to a Bluetooth channel, a Wi-Fi channel, a shared channel attached to communications associated with a group identifier that corresponds to the independent device group, etc., wherein the independent communication channel may vary among independent device groups based on the particular attributes associated with the individual IoT devices that make up each independent device group. As such, the IoT devices in the independent device group can use the selected independent communication channel to communicate with one another without interacting with the device organizer and without the device organizer directly intervening in the communication that occurs within the independent device group. In any case, in response to suitably directing the subset of IoT devices to form the independent device group and selecting an appropriate local communication channel associated therewith (and/or directing the subset of IoT devices forming the independent device group to select an appropriate local communication channel), the device organizer may then direct the independent device group that was formed at block 650 to implement the desired function at block 660.

While the method 600 shown in FIG. 6 has been described as if the device organizer is separate from the proximate IoT devices detected at block 610 and/or the subset of IoT devices determined at block 640, in at least one embodiment the device organizer can correspond to one of the IoT devices from block 610 and/or block 640. For example, the device organizer can correspond to a computer or cell phone that performs a device control or management operation in addition to using one or more attributes associated therewith to locally implement one or more desired functions (e.g., a computer may act as the device organizer to coordinate a lighting effect for a projection screen while separately adjusting a contrast ratio of video being streamed to the projector for output in order to adapt to the coordinated lighting effect, etc.). Accordingly, while FIG. 7 and FIG. 9 for example show signaling between the device organizer and various IoT devices, this signaling can be omitted where the device organizer itself corresponds to the relevant IoT device.

According to various aspects of the disclosure, an exemplary implementation of the method 600 shown in FIG. 6 is described below with respect to FIGS. 7-9. In particular, FIGS. 7 and 9 illustrate two alternative use cases for the desired function in the operating environment of FIG. 8, whereby the desired function can correspond to a lighting control function (e.g., FIG. 7) or a temperature control function (e.g., FIG. 9).

Figure 7:
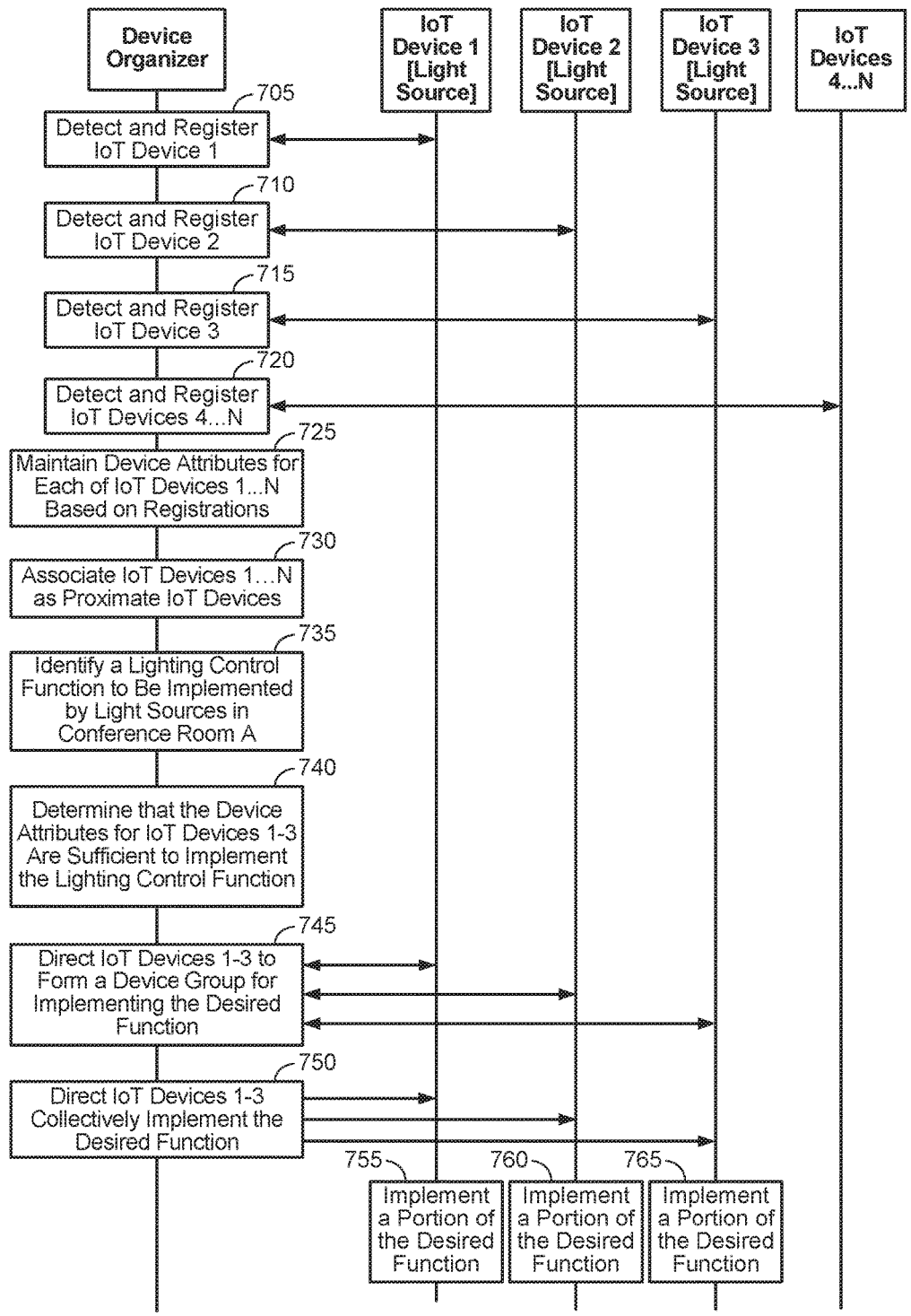
FIG. 7 illustrates an exemplary implementation of the method illustrated in FIG. 6, according to various aspects of the disclosure.
Figure 8:
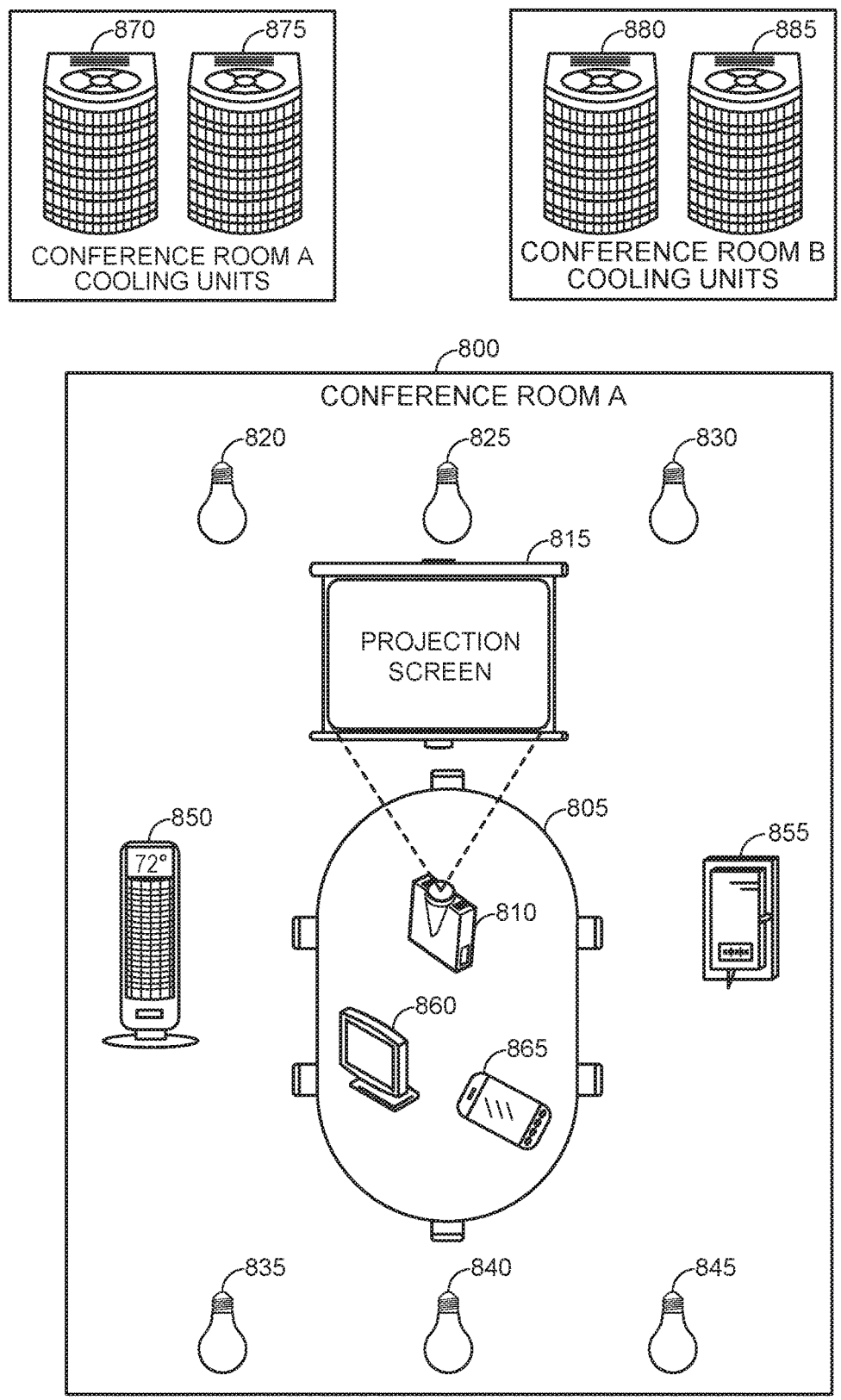
FIG. 8 illustrates an exemplary operating environment including a set of IoT devices, according to various aspects of the disclosure.
Figure 9:
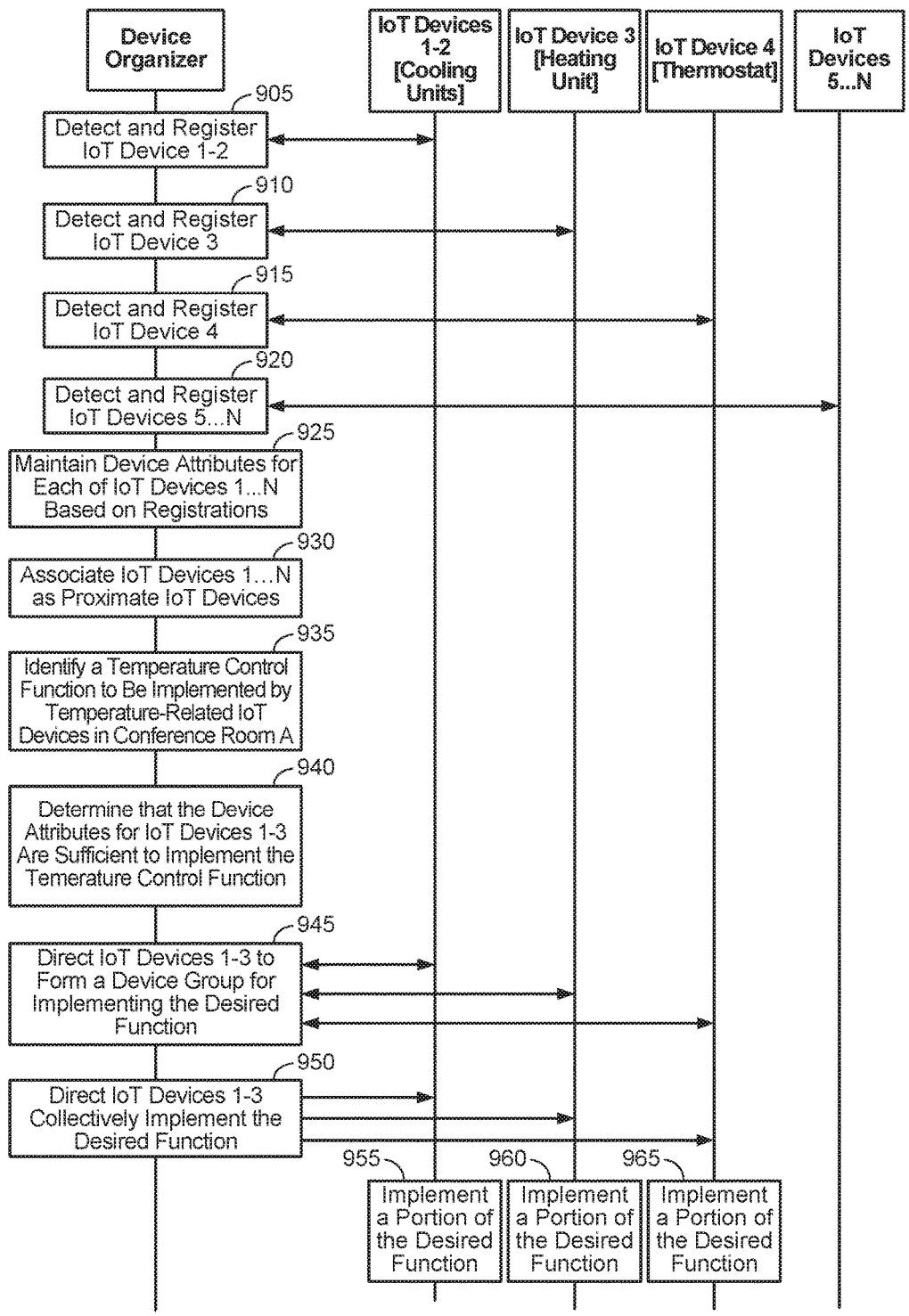
FIG. 9 illustrates another exemplary implementation of the method illustrated in FIG. 6, according to various aspects of the disclosure.

Referring to FIG. 8, assume that a given conference room 800 ("Conference Room A") includes a conference table 805, a projection screen 815, and a projector 810 (e.g., which may itself be an IoT device) that may be mounted on the conference table 805 and configured to project images onto the projection screen 815. Additionally, the conference room 800 may include various IoT devices 820-865, wherein IoT devices 820-830 may be light sources that are installed near the projection screen 815, IoT devices 835-845 may be light sources that are installed at an opposite side of the room from the projection screen 815, IoT device 850 may be a heating unit, IoT device 855 may be a thermostat, IoT device 860 may be a desktop computer, and IoT device 865 may be a tablet computer. Further assume that IoT devices 870-885 are positioned outside of the conference room 800, whereby IoT devices 870-875 may be air conditioning units configured to provide cool air to the conference room 800 and IoT devices 880-885 may be air conditioning units configured to provide cool air to another conference room (not shown). Under these assumptions, FIG. 7 will be described with respect to a lighting control function and FIG. 9 will then be described under the same assumptions for a temperature control function use case.

For example, referring to FIG. 7, the device organizer may detect and register IoT devices 1 . . . N at blocks 705-720, whereby N is greater than or equal to 4 (e.g., as in block 610 of FIG. 6). As discussed above with respect to FIG. 6, the detection and registration procedures at blocks 705-720 can occur over a bootstrapping channel. In FIG. 7, assume that the IoT devices 1 . . . 3 respectively correspond to the IoT devices 820-830 shown in FIG. 8 and that IoT devices 4 . . . N respectively correspond to the IoT devices 835-885 shown in FIG. 8. The device organizer may maintain device attributes for each of IoT devices 1 . . . N at block 725 (e.g., as in block 620 of FIG. 6), wherein the device organizer can obtain the device attributes associated with IoT devices 1 . . . N in conjunction with the detection and registration procedures performed at blocks 705-720. Thus, at block 725, assume that the device organizer is aware that IoT devices 820-830 are light sources that provide light in proximity to the projection screen 815 in the conference room 800, that IoT device 855 is a thermostat that monitors temperature in the conference room 800, and so on.

Referring to FIG. 7, at some later point in time, the device organizer may detect that the projector 810 is turned on during a presentation, and in response thereto, the device organizer may identify a lighting control function that accommodates viewing of the projection screen 815 at block 735 (e.g., as in block 630 of FIG. 6). For example, the projector 810 may be an IoT device configured to indicate, to the device organizer, when media is being output by the projector onto the projection screen 815, and the device organizer may determine to implement the lighting control function whenever the device organizer detects that the projector is outputting the media.

Using the attributes associated with the IoT devices 1 . . . N from 725, the device organizer may then determine a subset of IoT devices 1 . . . N that can implement the lighting control function based on their respective sets of attributes at block 740 (e.g., as in block 640 of FIG. 6). In this case, the device organizer may focus on light-emitting attributes of the proximate light sources, although light-recording (or light-sensing) attributes can also be considered (e.g., to monitor the effectiveness of the lighting control scheme to provide feedback to the proximate light sources, light-sensing or video-recording IoT devices can be made part of the subset in order to relay feedback to the light sources). In the example operating environment of FIG. 8, light sources 820-830 may be arranged closer to the projection screen 815 and thereby have a greater effect on how much light affects the visibility of the projection screen 815 as compared to light sources 835-845. For this reason, light sources 820-830 are included in the subset determined at 740 while light sources 835-845 are excluded. Also, any other IoT device that does not have a lighting attribute is similarly excluded from the subset at 740. However, in an alternative embodiment, light sources 835-845 can be included in the subset and can simply be controlled differently from light sources 820-830 (e.g., light sources 820-830 may be limited to an output of 80 lumens while light sources 835-845 are permitted to emit light at up to 120 lumens, etc.).

While not shown in FIG. 7, those skilled in the art will appreciate that additional electronic devices can affect lighting on a smaller scale than the light sources 820-845 (e.g., the thermostat 855 and heating unit 850 may have LED outputs to indicate temperature settings, the desktop computer 860 or tablet computer 865 may have display screens that output light, etc.). In another embodiment, the light output from any IoT device can be monitored and tracked so that any IoT device can be made part of the independent device group formed to implement the lighting control function. In this scenario, the displays of the desktop computer 860 or tablet computer 865 could be dimmed in conjunction with the lighting control function in an example, and so on.

After the device organizer determines the subset at block 740, the device organizer may direct the subset of IoT devices 1 . . . 3 to form an independent device group at block 745. The independent device group formed at block 745 may be associated with an independent channel through which the IoT devices in the independent device group can communicate without further direct intervention by or interaction with the device organizer. For example, the independent channel can correspond to a Bluetooth channel, a Wi-Fi channel, a group identifier attached to communications over a shared channel, etc. The device organizer may then direct the independent device group formed at block 745 to implement the desired function of modifying their light emission to accommodate visibility of the projection screen 815 at block 750, and the independent device group of IoT devices 1 . . . 3 may implement the desired function by having each of IoT devices 1 . . . 3 modify their light emission characteristics accordingly at blocks 755, 760 and 765. For example, at blocks 755-765, IoT devices 1 . . . 3 may each lower their collective light output by 50 lumens, one or more of the IoT devices 1 . . . 3 may adjust the direction of their light emissions to angle away from the projection screen 815 to reduce interference, one or more of the IoT devices 1 . . . 3 may change from a white light to a red light if adaptive color output is possible, and so on.

Turning now to FIG. 9, the device organizer may detect and register IoT devices 1 . . . N denoted as IoT devices 1 . . . N between blocks 905-920, whereby N is greater than or equal to 5 (e.g., as in block 610 of FIG. 6). As discussed above with respect to FIG. 6, the detection and registration procedures performed at blocks 905-920 can occur over a bootstrapping channel. In FIG. 9, assume that the IoT devices 1 . . . 4 respectively correspond to IoT devices 870-875 and 850-855 shown in FIG. 8, and further that IoT devices 5 . . . N respectively correspond to IoT devices 820-845, 860-865 and 880-885 shown in FIG. 8. The device organizer may maintain device attributes associated with each of IoT devices 1 . . . N at block 925 (e.g., as in block 620 of FIG. 6), wherein the device organizer may obtain the attributes associated with the IoT devices 1 . . . N in conjunction with the detection and registration procedures performed at blocks 905-920. Thus, at block 925, assume that the device organizer is aware that IoT device 850 is a heating unit, IoT device 855 is a thermostat that monitors temperature in the conference room 800 and controls the air conditioning units 870-875, IoT devices 870-875 are air conditioning units configured to cool the conference room 800, and so on.

Still referring to FIG. 9, at some later point in time, the device organizer may determine to adjust the temperature in the conference room 800. For example, the thermostat 855 may report to the device organizer that the current temperature in the conference room 800 is 71 degrees Fahrenheit, and the tablet computer 865 may be registered to a user that prefers a room temperature of 68 degrees Fahrenheit. Thus, the combination of the presence of the tablet computer 865 in conjunction with the current room temperature being above 68 degrees Fahrenheit may trigger the device organizer to form an independent device group that includes IoT devices configured to implement a temperature control function in the conference room 800.

Using the attributes associated with the IoT devices 1 . . . N from 925, the device organizer may determine a subset of IoT devices 1 . . . N that can implement the temperature control function based on their respective sets of attributes at block 940 (e.g., as in block 640 of FIG. 6). In particular, the device organizer may focus on temperature control attributes associated with IoT devices 1 . . . N. In this case, air conditioning units 870-875 are included in the subset determined at block 940 because air conditioning units 870-875 provide cool air to the conference room 800, while air conditioning units 880-885 are excluded from the subset because air conditioning units 880-885 provide cool air to a different room. Also, heating unit 850 may be added to the subset because heating unit 850 has a capability to increase the room temperature, and thermostat 855 may be added to the subset because thermostat 855 has a capability to monitor room temperature in the conference room 800. Any other IoT device that does not have a temperature control attribute may be excluded from the subset at block 940. Furthermore, while not shown in FIG. 9, those skilled in the art will appreciate that any electronic device may affect temperature somewhat because processors and memory consume electricity and produce heat. As such, in one embodiment, the temperature output of other IoT device types can be made part of the subset for implementing the temperature control function (e.g., where temperature may be regulated more precisely or where such IoT devices can more significantly impact the ambient room temperature, as in a server room where servers generate substantial heat).

After the device organizer determines the subset at block 940, the device organizer may direct the subset of IoT devices 1 . . . 4 to form an independent device group at block 945. The independent device group formed at block 945 may be associated with an independent channel through which the IoT devices in the independent device group can communicate without further direct intervention by or interaction with the device organizer. For example, the independent channel can correspond to a Bluetooth channel, a Wi-Fi channel, a group identifier attached to communications over a shared channel, etc. The device organizer may then direct the independent device group formed at block 945 to implement the desired function of modifying the temperature in the conference room 800 at block 950, and the independent device group of IoT devices 1 . . . 4 may implement the desired function by having each of IoT devices 1 . . . 4 cool, heat and/or monitor temperature in the conference room 800 to achieve the temperature adjustment at blocks 955, 960 and 965. For example, at blocks 955-965, the IoT devices 1 . . . 4 may work together to maintain a target temperature of 68 degrees Fahrenheit, wherein the thermostat 855 may track the temperature in the conference room 800, air conditioners 870-875 may turn on if the thermostat 855 indicates a temperature above 68 degrees Fahrenheit and are otherwise turned off, and heating unit 850 may turn on if the thermostat 855 indicates a temperature below 68 degrees Fahrenheit and is otherwise turned off.

Of course, many other use cases implementing the method 600 of FIG. 6 are also possible aside from and/or in addition to the examples shown in FIGS. 7-9, as those skilled in the art will appreciate.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for Internet of Things (IoT) group communication, comprising:
   forming multiple IoT devices into multiple IoT groups according to one or more group criteria and one or more attributes associated with the multiple IoT devices; and
   defining one or more hierarchies to rank the IoT devices within each IoT group according to the one or more group criteria and the one or more attributes associated with the IoT devices in each IoT group, wherein the one or more hierarchies designate a group owner in each IoT group to control:
      intra-group communication in which the ranked IoT devices within each respective IoT group communicate with one another over a shared local channel dedicated to intra-group communications associated with a group identifier that corresponds to the respective IoT group, and
      inter-group communication in which only the designated group owners associated with the multiple IoT groups communicate with one another.

2. The method recited in claim 1, wherein defining the one or more hierarchies comprises:
   designating the group owner within each IoT group according to one or more static attributes that are permanently common among the IoT devices in each IoT group or one or more dynamic attributes that are temporarily common to the IoT devices in each IoT group.

3. The method recited in claim 1, wherein a server communicates with the group owners in each IoT group to further coordinate the inter-group communication.

4. The method recited in claim 1, wherein the group owners in each IoT group communicate peer-to-peer to coordinate the inter-group communication.

5. The method recited in claim 1, wherein the inter-group communication comprises:
   sending a message from an IoT device in a first IoT group to an address associated with a target IoT group, wherein the group owner associated with the target IoT group receives the message and forwards the received message to other IoT devices in the target IoT group according to the one or more hierarchies that control the inter-group communication.

6. The method recited in claim 1, wherein defining the one or more hierarchies comprises:
   designating one or more ranking members within each IoT group, wherein the designated ranking members coordinate the intra-group communication within each IoT group.

7. The method recited in claim 1, wherein the one or more group criteria include one or more static criteria and the one or more hierarchies are defined based on the one or more static criteria and permanent attributes associated with the one or more IoT devices in each IoT group.

8. The method recited in claim 1, wherein forming the multiple IoT devices into the multiple IoT groups comprises:
   forming at least one predefined IoT group that includes one or more members having one or more permanent attributes in common, wherein the one or more group criteria comprise static criteria based on the one or more permanent attributes.

9. The method recited in claim 1, wherein the one or more group criteria include one or more dynamic criteria, wherein the one or more hierarchies are defined based on the one or more dynamic criteria, and wherein the one or more attributes are based at least in part on a context that relates to a current status associated with the one or more IoT devices in each IoT group.

10. The method recited in claim 1, wherein forming the multiple IoT devices into the multiple IoT groups comprises:
    forming at least one ad-hoc IoT group that includes one or more members having one or more common attributes that are limited to a current context based at least in part on a current status associated therewith, wherein the one or more group criteria comprise dynamic criteria based on the one or more common attributes limited to the current context.

11. The method recited in claim 10, wherein forming the at least one ad-hoc IoT group comprises:
    detecting a plurality of the multiple IoT devices that are in proximity to one another;
    identifying a desired function to implement;
    determining a subset of the plurality of IoT devices that have capabilities to implement the desired function based on the one or more attributes associated therewith;
    directing the determined subset of the plurality of IoT devices to form an independent device group configured to communicate over a local communication channel, wherein the at least one ad-hoc IoT group includes at least the independent device group, and wherein the local communication channel is selected subsequent to the determined subset of the plurality of IoT devices forming the independent device group; and
    directing the independent device group to implement the desired function.

12. The method recited in claim 11, wherein a device organizer proximate to the plurality of IoT devices detects the plurality of IoT devices via a bootstrapping channel.

13. The method of claim 11, wherein:
    the detected plurality of IoT devices includes one or more light sources,
    the desired function to implement comprises reducing light interference near a projection screen in proximity to the plurality of IoT devices,
    the one or more attributes include light emission capabilities, installation positions, and light output orientations associated with the one or more light sources,
    the subset of the plurality of IoT devices formed into the independent device group are expected to cause the light interference near the projection screen based on one or more of the light emission capabilities, the installation positions, or the orientations associated with the one or more light sources, and
    the subset of the plurality of IoT devices formed into the independent device group are configured to reduce the light interference near the projection screen by one or more of reducing light output levels or changing the light output orientations associated therewith.

14. The method of claim 11, wherein:
    the detected plurality of IoT devices includes one or more air conditioners,
    the desired function to implement comprises cooling a room,
    the one or more attributes include identified areas that the one or more air conditioners can cool and capabilities that the one or more air conditioners have to cool the identified areas, the subset of the plurality of IoT devices formed into the independent device group are configured to cool the room, and the subset of the plurality of IoT devices formed into the independent device group are configured to adjust cooling output levels to cool the room.

15. The method recited in claim 1, further comprising detecting the multiple IoT devices via a bootstrapping channel, wherein the bootstrapping channel corresponds to a wireless frequency or one or more timeslots reserved to discover and register IoT devices.

16. The method recited in claim 1, further comprising selecting, subsequent to forming each IoT group, the shared local channel to dedicate to the intra-group communications associated with the group identifier that corresponds to the respective IoT group based on the one or more attributes associated with the IoT devices in the respective IoT group.

17. An apparatus, comprising:
means for forming multiple Internet of Things (IoT) devices into multiple IoT groups according to one or more group criteria and one or more attributes associated with the multiple IoT devices; and
means for defining one or more hierarchies to rank the IoT devices within each IoT group according to the one or more group criteria and the one or more attributes associated with the IoT devices in each IoT group, wherein the one or more hierarchies designate a group owner in each IoT group to control:
intra-group communication in which the ranked IoT devices within each respective IoT group communicate with one another over a shared local channel dedicated to intra-group communications associated with a group identifier that corresponds to the respective IoT group, and
inter-group communication in which only the designated group owners associated with the multiple IoT groups communicate with one another.

18. The apparatus recited in claim 17, wherein the means for defining the one or more hierarchies is further configured to designate the group owner within each IoT group according to one or more static attributes that are permanently common among the IoT devices in each IoT group or one or more dynamic attributes that are temporarily common to the IoT devices in each IoT group.

19. The apparatus recited in claim 17, wherein the means for defining the one or more hierarchies is further configured to designate one or more ranking members within each IoT group, wherein the designated ranking members coordinate the intra-group communication within each IoT group.

20. The apparatus recited in claim 17, wherein the one or more group criteria include one or more static criteria and the one or more hierarchies are defined based on the one or more static criteria and permanent attributes associated with the one or more IoT devices in each IoT group.

21. The apparatus recited in claim 17, wherein the means for forming the multiple IoT devices into the multiple IoT groups is further configured to form at least one predefined IoT group that includes one or more members having one or more permanent attributes in common, wherein the one or more group criteria comprise static criteria based on the one or more permanent attributes.

22. The apparatus recited in claim 17, wherein the one or more group criteria include one or more dynamic criteria, wherein the one or more hierarchies are defined based on the one or more dynamic criteria, and wherein the one or more attributes are based at least in part on a context that relates to a current status associated with the one or more IoT devices in each IoT group.

23. The apparatus recited in claim 17, wherein the means for forming the multiple IoT devices into the multiple IoT groups is further configured to form at least one ad-hoc IoT group that includes one or more members having one or more common attributes that are limited to a current context based at least in part on a current status associated therewith, wherein the one or more group criteria comprise dynamic criteria based on the one or more common attributes limited to the current context.

24. The apparatus recited in claim 23, wherein the means for forming the at least one ad-hoc IoT group is further configured to:
determine a subset of a plurality of IoT devices that are in proximity to one another and have capabilities to implement a desired function based on the one or more attributes associated therewith; and
direct the determined subset of the plurality of IoT devices to form an independent device group configured to communicate over a local communication channel to implement the desired function, wherein the at least one ad-hoc IoT group includes at least the independent device group, and wherein the local communication channel is selected subsequent to the determined subset of the plurality of IoT devices forming the independent device group.

25. The apparatus recited in claim 24, further comprising means for detecting the plurality of IoT devices when the plurality of IoT devices are in proximity to the apparatus.

26. A device for organizing an Internet of Things (IoT) network, comprising:
a memory configured to store one or more group criteria; and
one or more processors configured to form multiple IoT devices into multiple IoT groups according to the one or more group criteria and one or more attributes associated with the multiple IoT devices and define one or more hierarchies to rank the IoT devices within each IoT group according to the one or more group criteria and the one or more attributes associated with the IoT devices in each IoT group, wherein the one or more hierarchies designate a group owner in each IoT group to control:
intra-group communication in which the ranked IoT devices within each respective IoT group communicate with one another over a shared local channel dedicated to intra-group communications associated with a group identifier that corresponds to the respective IoT group, and
inter-group communication in which only the designated group owners associated with the multiple IoT groups communicate with one another.

27. The device recited in claim 26, wherein the one or more processors are further configured to designate the group owner within each IoT group according to one or more static attributes that are permanently common among the IoT devices in each IoT group or one or more dynamic attributes that are temporarily common to the IoT devices in each IoT group.

28. The device recited in claim 26, wherein the one or more processors are further configured to designate one or more ranking members within each IoT group to define the one or more hierarchies, wherein the designated ranking members coordinate the intra-group communication within each IoT group.

29. The device recited in claim 26, wherein the one or more group criteria include one or more static criteria and the one or more hierarchies are defined based on the one or more static criteria and permanent attributes associated with the one or more IoT devices in each IoT group.

30. The device recited in claim 26, wherein the one or more processors are further configured to form at least one predefined IoT group that includes one or more members having one or more permanent attributes in common to form the multiple IoT groups, wherein the one or more group criteria comprise static criteria based on the one or more permanent attributes.

31. The device recited in claim 26, wherein the one or more group criteria include one or more dynamic criteria, wherein the one or more hierarchies are defined based on the one or more dynamic criteria, and wherein the one or more attributes are based at least in part on a context that relates to a current status associated with the one or more IoT devices in each IoT group.

32. The device recited in claim 26, wherein the one or more processors are further configured to form at least one ad-hoc IoT group that includes one or more members having one or more common attributes that are limited to a current context based at least in part on a current status associated therewith to form the multiple IoT groups, wherein the one or more group criteria comprise dynamic criteria based on the one or more common attributes limited to the current context.

33. The device recited in claim 32, wherein the one or more processors are further configured to determine a subset of a plurality of IoT devices that are in proximity to one another and have capabilities to implement a desired function based on the one or more attributes associated therewith and direct the determined subset of the plurality of IoT devices to form an independent device group configured to communicate over a local communication channel to implement the desired function, wherein the at least one ad-hoc IoT group includes at least the independent device group, and wherein the local communication channel is selected subsequent to the determined subset of the plurality of IoT devices forming the independent device group.

34. The device recited in claim 33, further comprising:
a bootstrapping channel, wherein the one or more processors are further configured to detect the plurality of IoT devices via the bootstrapping channel when the plurality of IoT devices are in proximity to the device.

35. A non-transitory computer-readable storage medium having computer-executable instructions recorded thereon, wherein executing the computer-executable instructions on one or more processors causes the one or more processors to:
form multiple Internet of Things (IoT) devices into multiple IoT groups according to one or more group criteria and one or more attributes associated with the multiple IoT devices; and
define one or more hierarchies to rank the IoT devices within each IoT group according to the one or more group criteria and the one or more attributes associated with the IoT devices in each IoT group, wherein the one or more hierarchies designate a group owner in each IoT group to control:
intra-group communication in which the ranked IoT devices within each respective IoT group communicate with one another over a shared local channel dedicated to intra-group communications associated with a group identifier that corresponds to the respective IoT group, and
inter-group communication in which only the designated group owners associated with the multiple IoT groups communicate with one another.

36. The non-transitory computer-readable storage medium recited in claim 35, wherein executing the computer-executable instructions on the one or more processors further causes the one or more processors to designate the group owner within each IoT group according to one or more static attributes that are permanently common among the IoT devices in each IoT group or one or more dynamic attributes that are temporarily common to the IoT devices in each IoT group.

37. The non-transitory computer-readable storage medium recited in claim 35, wherein executing the computer-executable instructions on the one or more processors further causes the one or more processors to designate one or more ranking members within each IoT group, wherein the designated ranking members coordinate the intra-group communication within each IoT group.

38. The non-transitory computer-readable storage medium recited in claim 35, wherein the one or more group criteria include one or more static criteria and one or more dynamic criteria, wherein the one or more hierarchies are defined based on the one or more static criteria and permanent attributes associated with the one or more IoT devices in each IoT group, wherein the one or more hierarchies are further defined based on the one or more dynamic criteria, and wherein the one or more attributes are based at least in part on a context that relates to a current status associated with the one or more IoT devices in each IoT group.

39. The non-transitory computer-readable storage medium recited in claim 35, wherein executing the computer-executable instructions on the one or more processors further causes the one or more processors to form at least one predefined IoT group that includes one or more members having one or more permanent attributes in common, wherein the one or more group criteria comprise static criteria based on the one or more permanent attributes.

40. The non-transitory computer-readable storage medium recited in claim 35, wherein executing the computer-executable instructions on the one or more processors further causes the one or more processors to form at least one ad-hoc IoT group that includes one or more members having one or more common attributes that are limited to a current context based at least in part on a current status associated therewith, wherein the one or more group criteria comprise dynamic criteria based on the one or more common attributes limited to the current context.

41. The non-transitory computer-readable storage medium recited in claim 40, wherein executing the computer-executable instructions on the one or more processors further causes the one or more processors to:
determine a subset of a plurality of IoT devices that are in proximity to one another and have capabilities to implement a desired function based on the one or more attributes associated therewith; and
direct the determined subset of the plurality of IoT devices to form an independent device group configured to communicate over a local communication channel to implement the desired function, wherein the at least one ad-hoc IoT group includes at least the independent device group, and wherein the local communication channel is selected subsequent to the determined subset of the plurality of IoT devices forming the independent device group.

42. The non-transitory computer-readable storage medium recited in claim 41, wherein executing the computer-executable instructions on the one or more processors further causes the one or more processors to detect the plurality of IoT devices via a bootstrapping channel.

* * * * *